United States Patent
Plattenburg et al.

(10) Patent No.: US 12,395,569 B2
(45) Date of Patent: Aug. 19, 2025

(54) PROVIDING LOCAL PUSH NOTIFICATIONS FOR CREW MEMBERS OF A MASS TRANSPORTATION VEHICLE

(71) Applicant: Delta Air Lines, Inc., Atlanta, GA (US)

(72) Inventors: Brian George Plattenburg, Decatur, GA (US); Brian Ashley Still, Melbourne, FL (US); Howard Ramon Vining, Atlanta, GA (US)

(73) Assignee: DELTA AIR LINES, INC., Atlanta, GA (US)

( * ) Notice: Subject to any disclaimer, the term of this patent is extended or adjusted under 35 U.S.C. 154(b) by 20 days.

(21) Appl. No.: 18/584,280

(22) Filed: Feb. 22, 2024

(65) Prior Publication Data

US 2024/0396978 A1    Nov. 28, 2024

Related U.S. Application Data

(60) Provisional application No. 63/503,987, filed on May 24, 2023.

(51) Int. Cl.
*H04L 67/55* (2022.01)

(52) U.S. Cl.
CPC ................... *H04L 67/55* (2022.05)

(58) Field of Classification Search
CPC ........ H04L 67/55; H04L 67/12; H04W 4/029; H04W 4/42
See application file for complete search history.

(56) References Cited

U.S. PATENT DOCUMENTS

| 9,665,998 | B1 | 5/2017 | Shields et al. |
| 10,051,421 | B2 * | 8/2018 | Pinard ................. H04W 4/029 |
| 11,101,874 | B1 | 8/2021 | Yerli |
| 2017/0228804 | A1 | 8/2017 | Soni et al. |
| 2018/0287986 | A1 | 10/2018 | Yoon et al. |
| 2019/0379584 | A1 | 12/2019 | Fischer et al. |

(Continued)

OTHER PUBLICATIONS

Qutheory, LLC, "Vapor," https://vapor.codes/, retrieved on Feb. 21, 2024, 4 pages.

(Continued)

*Primary Examiner* — Benjamin M Thieu
(74) *Attorney, Agent, or Firm* — Edell, Shapiro & Finnan, LLC

(57) ABSTRACT

Provided herein are techniques to facilitate sending notifications to one or more wireless crew devices for travel crew members that may be assigned to provide passenger services for a duration of travel involving a mass transportation vehicle. In one instance, a method may include identifying, by a wireless device and based on the vehicle travel information, whether one or more local push notifications are to be received by the wireless device for a duration of travel involving a vehicle and registering with a notification server of the vehicle to receive the local push notifications in which the local push notifications that are to be received by the wireless device are based on a role of the travel crew member for the duration of travel and are based on location (s) of a cabin of the vehicle to which the travel crew member is assigned to perform passenger services.

20 Claims, 8 Drawing Sheets

(56) References Cited

U.S. PATENT DOCUMENTS

| | | | |
|---|---|---|---|
| 2022/0038399 A1* | 2/2022 | Sain | H04L 65/4046 |
| 2023/0259835 A1* | 8/2023 | Kasbe | G06N 5/022 |
| | | | 705/5 |

OTHER PUBLICATIONS

Apple, Inc., "Receiving Voice and Text Communications on a Local Network," Apple Developer Documentation, https://developer.apple.com/documentation/networkextension/local_push_connectivity/receiving_voice_and_text_communications_on_a_local_network, retrieved on Feb. 21, 2024, 3 pages.

Apple, Inc., "Local push connectivity," Apple Developer Documentation, https://developer.apple.com/documentation/networkextension/local_push_connectivity, retrieved on Feb. 21, 2024, 3 pages.

\* cited by examiner

PROVIDING LOCAL PUSH NOTIFICATIONS FOR CREW MEMBERS OF A MASS TRANSPORTATION VEHICLE

PRIORITY CLAIM

This application claims the benefit of priority under 35 U.S.C. § 119 (e) to U.S. Provisional Patent Application No. 63/503,987, filed on May 24, 2023, which application is hereby incorporated by reference in its entirety.

TECHNICAL FIELD

The present disclosure relates to network equipment and services for mass transportation vehicles.

BACKGROUND

Mass transportation vehicles typically offer different amenities and services to passengers, such as food and beverage services. With the development of new electronic networking architectures, there are new opportunities to provide or augment different amenities and services that can be provided to passengers of mass transportation vehicles.

DETAILED DESCRIPTION

Overview

Figure 1A:
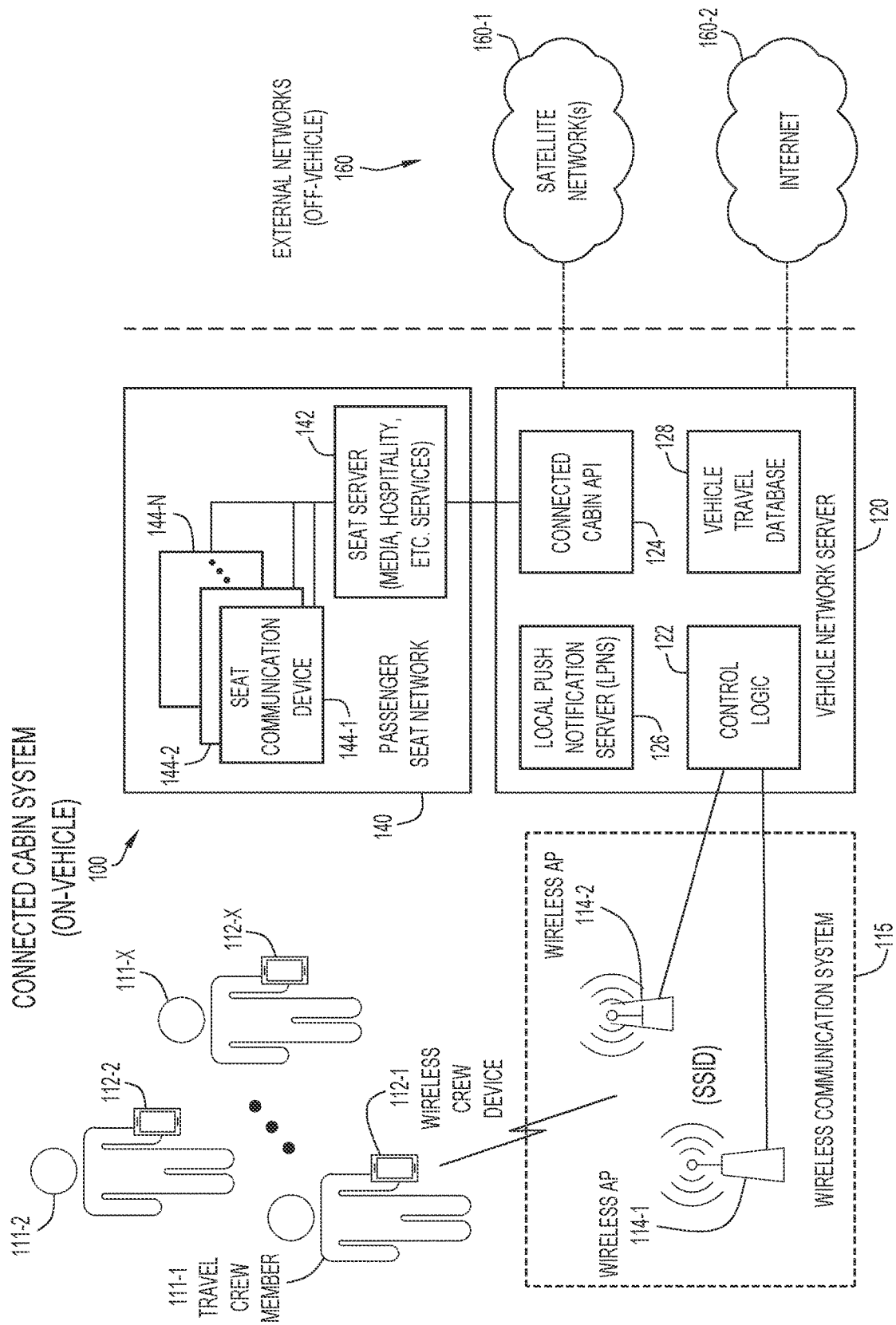
FIG. 1A is a block diagram of a connected cabin system that may facilitate local push notifications for crew members of a mass transportation vehicle for a duration of travel involving the vehicle, according to an example embodiment.

Provided herein are techniques through which local push notifications can be enabled for wireless devices of one or more crew members that may be providing passenger services (e.g., food/beverage service, etc.) for passengers traveling on a mass transportation vehicle for a duration of travel involving the vehicle. In various example embodiments, a mass transportation vehicle may include aircraft, busses, ships, trains, or any other vehicle capable of transporting a plurality of passengers for a duration of travel involving multiple geographic locations or, more generally, any mass transportation device capable of traveling via any combination of air, water, and/or land.

Wireless devices of crew members (also referred to herein interchangeably as 'travel crew members') providing passenger or travel services (e.g., hospitality services, such as food/beverages services, etc.) for a duration of travel involving a mass transportation vehicle may also be referred to herein interchangeably as 'wireless crew devices' in which such wireless crew devices can include, but not be limited to, mobile phones, tablets, or the like that travel crew members may utilize to access and/or obtain electronic information that may be available via one or more networks/systems that may be provided for a mass transportation vehicle.

In various embodiments, networks/systems that may be accessed/utilized by travel crew members for a mass transportation vehicle can include, but not be limited to, in-vehicle wireless/wired networks (e.g., wireless local area networks (WLANs), wireless personal area networks (WPANs), wired networks, etc.), passenger entertainment systems, hospitality systems (e.g., ordering/order fulfillment systems), passenger seating systems, travel information systems, vehicle information systems, combinations thereof, and/or the like.

In at least one embodiment, a computer-implemented method is provided that may include detecting, by a wireless device operated by a travel crew member, a trigger indicating that the wireless device is to connect to a wireless communication system of a vehicle and is to attempt to register for local push notifications for a duration of travel involving the vehicle and obtaining, by the wireless device upon connection to the wireless communication system of the vehicle, vehicle travel information that identifies the duration of travel involving the vehicle. The computer-implemented method may further include identifying, by the wireless device and based on the vehicle travel information, whether one or more local push notifications are to be received by the wireless device for the duration of travel involving the vehicle, wherein the identifying includes comparing the vehicle travel information that identifies the duration of travel involving the vehicle with travel assignment information that identifies durations of travel for a plurality of vehicles to which the travel crew member is assigned. Further, based on determining that one or more local push notifications are to be received by the wireless device for the duration of travel involving the vehicle, the computer-implemented method may further include registering, by the wireless device, with a notification server of the vehicle to receive the one or more local push notifications for the duration of travel involving the vehicle, wherein the one or more local push notifications that are to be received by the wireless device for the duration of travel involving the vehicle are based on a role of the travel crew member for the duration of travel involving the vehicle and are based on one or more locations of a cabin of the vehicle to which the travel crew member is assigned to perform passenger services for the duration of travel involving the vehicle.

Example Embodiments

It is common in the travel industry to provide services to passengers that are traveling aboard an aircraft, a ship, a train, etc. (generally referred to herein as 'mass transportation vehicles') from one city to another. During a trip or, more generally, a duration of travel involving such a mass transportation vehicle, a number of crew members for the vehicle can execute or otherwise provide services for the passengers, such as hospitality services, etc. that may involve providing food/beverage services for passengers, or other similar services. For example, a passenger may request a food/beverage item from a food/beverage service provided during a trip and the food/beverage request can be prepared and delivered via one or more crew members. Generally, this passenger request/crew response process can be viewed as an order request/order fulfilment process or exchange.

With the development of modern wireless communication devices, such as handheld wireless phones, tablets, etc. capable of wireless wide area and/or wireless local area communications, crew members providing passenger services for a given duration of travel involving a mass transportation device can receive notifications, via wireless devices carried/operated by the crew members, for passenger requests and/or other services that may be performed by such crew members for the duration of travel. Wireless devices of crew members (also referred to herein interchangeably as 'travel crew members') providing passenger services for a duration of travel involving a mass transportation vehicle may also be referred to herein interchangeably as 'wireless crew devices'.

In one example scenario, consider that a mass transportation vehicle is an aircraft that is flying from an originating airport to a destination airport. In this example, a passenger may request a beverage item during the flight that can trigger a local notification to be sent or 'pushed' to one or more wireless devices operated by one or more corresponding crew members and a crew member can facilitate fulfilment of the beverage request.

Current options for providing local push notifications for wireless crew devices for a duration of travel involving a mass transportation vehicle (e.g., during a flight for an aircraft) are limited to processes that involve high power usage for wireless crew devices and, thus, lead to increased battery drain of such devices throughout the duration of travel. For example, one potential option for providing local push notifications to a wireless crew device for a duration of travel involves playing a silent song in the background of the wireless crew device such that device 'stays awake' in order to receive push notifications. Thus, such an option involves the wireless crew device always being actively in-use (constantly playing the silent song) thereby causing increased battery drain of the device.

Another potential option for providing local push notifications to a wireless crew device for a duration of travel involves the use of short-range wireless communication system (e.g., Bluetooth®) beacons. For this option, Bluetooth low energy proximity sensing functionality can be used to transmit a universally unique identifier that can be received/identified by a compatible application or operating system. The identifier and several bytes sent with it can be used to determine a wireless crew device's location, track devices, and/or trigger a location-based action on the device, such as facilitating a push notification. However, this option requires additional hardware to be installed for a mass transportation vehicle that can emit/detect Bluetooth communication signals, as well as to process notifications. The installation of such hardware aboard a mass transportation vehicle, such as an aircraft, requires government certifications and/or approval, such as certification/approval from the Federal Aviation Administration (FAA) and, thus, is not a preferred option for providing local push notifications for travel crew members.

Techniques are described for various embodiments herein that can facilitate providing local push notifications for wireless devices of travel crew members providing passenger services for a duration of travel involving a mass transportation device, such as during a flight of an aircraft. Such techniques as provided by embodiments herein can reduce the amount battery drain of wireless crew devices in comparison to the 'silent song' option for providing local push notifications and may also be implemented in a manner that may not involve the installation of hardware for a mass transportation vehicle that could trigger government approval/certification procedures.

Figure 1B:
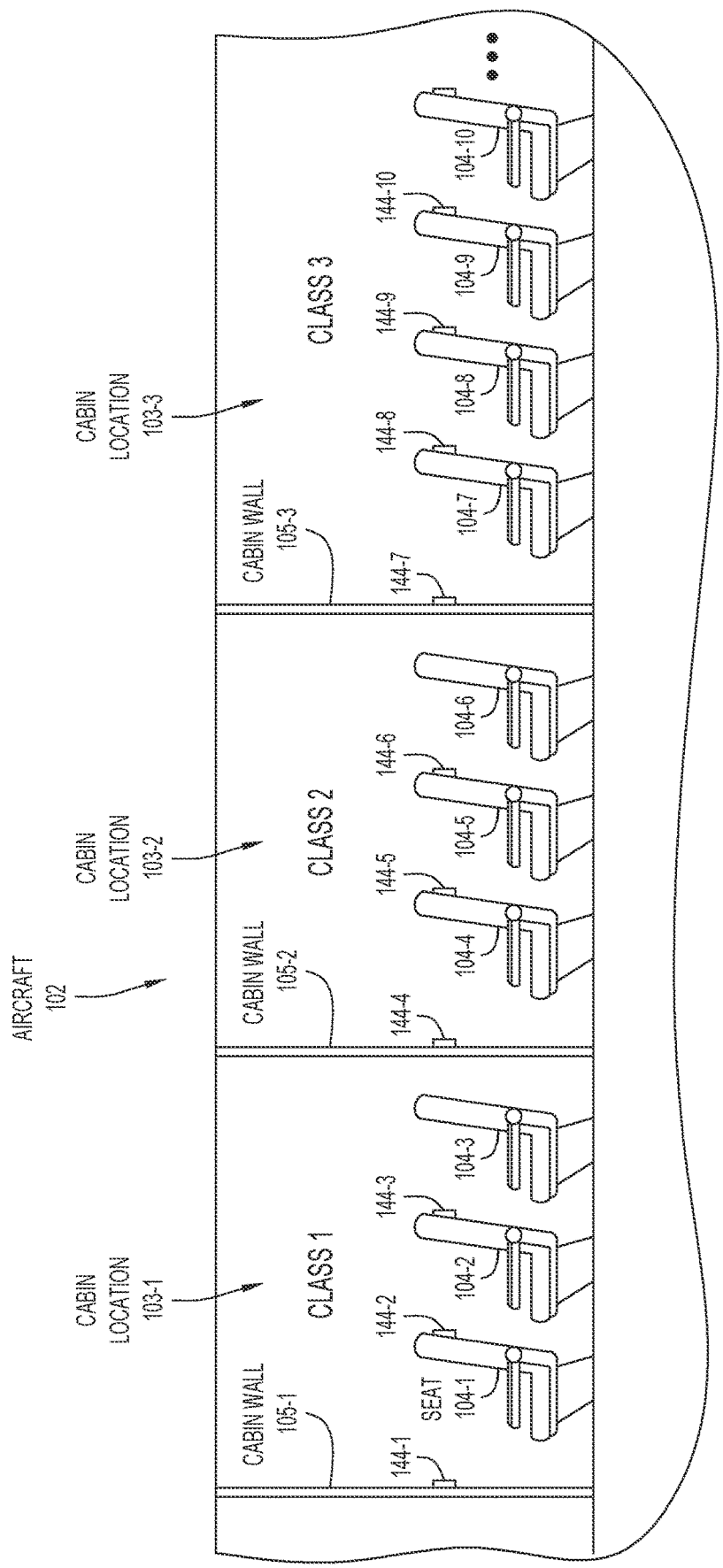
FIG. 1B is a diagram of a portion of a mass transportation vehicle, such as an aircraft, in which the connected cabin system of FIG. 1A may be implemented, according to an example embodiment.

Referring to FIG. 1A, FIG. 1A is a block diagram of a connected cabin system 100 that may facilitate local push notifications for crew members of a mass transportation vehicle for a duration of travel involving the vehicle, according to an example embodiment. FIG. 1B is a diagram of a portion of a mass transportation vehicle, such as an aircraft, in which the connected cabin system of FIG. 1A may be implemented, according to an example embodiment. FIGS. 1A and 1B are discussed together herein in connection with various embodiments of connected cabin system 100.

Connected cabin system 100 may include a number of wireless access points (APs), shown in FIG. 1A as a wireless AP 114-1 and a wireless AP 114-2, a vehicle network server 120, and a passenger seat network 140. Also shown in FIG. 1A are a number of travel crew members 111-1, 111-2 thru 111-X, each using or operating a corresponding wireless crew device 112-1, 112-2 thru 112-X within the connected cabin system 100. Although only two wireless APs are illustrated in FIG. 1A, it is to be understood that any number (more or less) of wireless APs can be configured for connected cabin system 100 in accordance with embodiments herein. Wireless APs 114-1 and 114-2 may provide a wireless communication system 115 for the connected cabin system 100.

In various embodiments, wireless APs 114-1 and 114-2 may implement any combination of a wireless local area air or radio frequency (RF) interface (e.g., any appropriate Institute of Electrical and Electronics Engineers (IEEE) 802.11 or Wi-Fi® RF interface, such as Wi-Fi 5, 6, 6E, 7, etc.) and/or a wireless wide area air or RF interface (e.g., any appropriate Third Generation Partnership Project (3GPP) or cellular RF interface, such as $4^{th}$ Generation/Long Term Evolution (4G/LTE), Fifth Generation (5G), etc.). Thus, wireless APs 114-1 and 114-2 may facilitate any combination of a wireless local area network (WLAN) and/or a wireless wide area (WWA) network in various embodiments or, more generally, medium and/or long-range wireless communications via wireless communication system 115 (medium/long-range wireless communications as compared to short-range wireless communication systems, such as Bluetooth®). Generally, WLAN (e.g., Wi-Fi®) communications may be considered medium-range wireless communications, whereas WWA (e.g., cellular) communications may be considered long-range wireless communications.

Wireless APs 114-1 and 114-2 may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air RF coverage for one or more radio access technology (RAT) types (e.g., Wi-Fi, 4G/LTE, 5G, etc.) for one or more radio access networks (RANs) of wireless communication system 115 through which one or more wireless devices, such as wireless crew devices may utilize to connect to vehicle network server 120 and, more specifically as discussed for embodiments herein, to LPNS 126 and connected cabin API 124.

A wireless device, such as any of wireless crew devices 112-1-112-X, may be considered any electronic device, etc. that initiates a connection or communication session with a corresponding wireless communication system, such as a computer, a mobile phone, an electronic tablet, and/or any other electronic device, component, element, or object capable of initiating voice, audio, video, media, or data exchanges within connected cabin system 100. Thus, wireless crew devices 112-1-112-X may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of a RAN, wireless AP 114-1 and/or wireless AP 114-2, for one or more communication sessions facilitated via the wireless communication system 115 of connected cabin system 100.

Each wireless crew device 112-1-112-X can be configured with a travel application (not shown in FIG. 1A), which may facilitate various operations for each wireless crew device 112-1-112-X in accordance with embodiments herein. The travel application can be provisioned, configured, updated, etc. for each wireless crew device 112-1-112-X by a travel/fleet operator that operates a fleet of mass transportation vehicles. For example, in one instance, the travel application can be provisioned for each wireless crew device 112-1-112-X by an airline operating a fleet of aircraft.

Vehicle network server 120 may include control logic 122, a connected cabin application programming interface (API) 124, and a local push notification server (LPNS) 126. Additionally, vehicle travel information can be stored via a vehicle travel database 128 via vehicle network server 120 and/or may be accessible by vehicle network server 120 in which the vehicle travel information can identify travel details for different durations of travel that a mass transportation vehicle may serve for a period of time (e.g., different flights that an aircraft is to perform for a day, etc.). Passenger seat network 140 may include a seat server 142 and a number of seat communication devices 144-1, 144-2 thru 144-N.

For the connected cabin system 100, each seat communication device 144-1-144.N can interface with seat server 142, which can further interface with vehicle network server 120 via connected cabin API 124. Connected cabin API 124 may further interface with LPNS 126 and control logic 122, which may also interface with LPNS 126. Control logic 122 of vehicle network server 120 may further interface with wireless APs 114-1 and 114-2.

The connected cabin system 100 of FIG. 1A may be considered an 'on-vehicle' system that can be implemented for a mass transit vehicle, such as an aircraft. A portion of an aircraft 102 in which the connected cabin system 100 may be implemented in at least one embodiment is shown in FIG. 1B. For the connected cabin system 100, consider that wireless APs 114-1 and 114-2 broadcast a network identifier for the wireless communication system 115 provided by the APs, which, for the embodiment of FIG. 1A, may be a Service Set Identifier (SSID) that identifies the wireless communication system 115 provided for aircraft 102.

Although certain embodiments/examples herein are discussed with reference to wireless communication system 115 being implemented as a WLAN configured with an SSID, in some embodiments a wireless communication system configured for a mass transportation vehicle can be implemented as a WWA communication system, such as a private 3GPP (cellular) communication system that can be configured with a public land mobile network (PLMN) identifier (ID). For example, for a large mass transportation vehicle, such as a ship, a train, or the like, the wireless communication system configured for the mass transportation vehicle can provide a long-range wireless communication coverage area, such as can be provided via a cellular access network (e.g., a 4G/LTE, 5G, next Generation (nG), etc.) access network. Thus, it is to be understood that embodiments herein involving mass transportation vehicles may encompass any combination of WLAN and/or WWA communication system.

Returning to FIG. 1A, in some embodiments, the connected cabin system 100 can interface with one or more external networks 160, which may be considered 'off-vehicle' networks, such as satellite network(s) 160-1 and/or a ground-based wide area network such as the (public) internet 160-2 and/or another wide area network. However, for a duration of travel involving the aircraft, the aircraft 102 can be disconnected from or isolated from ground-based networks. For example, while the aircraft 102 is in-flight, the vehicle network server 120 or, more specifically, LPNS 126, may not be connected to the internet 160-2, a wide area ground-based network, or the like.

Generally, control logic 122 of vehicle network server can include instructions that, when executed, cause processor(s) (not shown) of vehicle network server 120 to perform operations, which can include, but not be limited to, providing overall control operations of the server; interacting with and/or controlling other entities, systems, etc. described herein (e.g., providing management/control of wireless APs 114-1 and 114-2); maintaining and/or interacting with stored data, information, parameters, etc. (e.g., memory element(s), storage, data structures, databases, tables, etc.); combinations thereof; and/or the like to facilitate various operations for embodiments described herein.

Connected cabin API 124 can include instructions that, when executed by processor(s) of vehicle network server 120, can facilitate function calls/operations, application calls/operations, and/or the like to facilitate communications between LPNS 126, control logic 122, and passenger seat network 140/seat server 142 and/or any other elements, nodes, logic etc. that may be configured for connected cabin system 100.

LPNS 126 can include instructions that, when executed by processor(s) of vehicle network server 120, facilitates local push notifications that can be sent to one or more wireless crew devices 112-1-112-X of corresponding travel crew members 111-1-111-X via wireless APs 114-1-114-2, as discussed in further detail herein, below.

In at least one embodiment, LPNS 126 can be implemented within a Docker container with the vehicle network server 120 environment. In some embodiments, LPNS 126 can implemented via a virtual machine (VM) configured for vehicle network server 120. LPNS 126 may facilitate a computing environment that utilizes minimal compute resources (e.g., approximately 2 megabytes (MB) of memory or less) and may provide a Representational State Transfer (REST) interface (typically referred to as a 'RESTful' interface), a WebSocket interface, databases/storage, and/or any other customizable communication protocols, and/or generic server side interfaces that may be used to facilitate connections with wireless crew devices 112-1-112-X in order to facilitate various local push notification operations as discussed for embodiments herein.

The computing environment provided by LPNS 126 may be implemented in such a manner as to comply with various vehicle environmental and/or operational constraints such that implementation of the LPNS 126 within the connected cabin system 100 of aircraft 102 does not require additional government (e.g., FAA) certification and/or approval.

In various embodiments, seat server 142 facilitates operations, interactions, communications, etc. with seat communication devices 144-1-144-N through which passengers traveling aboard aircraft 102 for a trip (i.e., a duration of travel) may interact via a user interface (UI) provided by the seat communication devices 144-1-144-N in order to initiate hospitality/passenger requests (e.g., food/beverage requests, blanket/pillow requests, change seat requests, upgrade requests, do not disturb requests (or updates to such requests, such as do not disturb on/off), and/or any other requests that may be initiated via a seat-based communication device), watch videos, listen to music, play games, obtain passenger-specific and/or flight-specific information (e.g., remaining flight time, connecting gate information, travel itinerary information, baggage claim information, etc.) and/or consume/interact with any other information that may be provided via connected cabin system 100/seat server 142 for the duration of travel involving aircraft 102. Thus, seat server 142 may be configured to provide any communication protocols, API functionality/operations (e.g., to interface with connected cabin API 124), media server operations, and/or the like to facilitate operations for connected cabin system 100 in accordance with embodiments herein.

In various embodiments, seat communication devices 144-1-144-N may be implemented as any computing device capable of facilitating communications (wired and/or wirelessly), hosting/streaming media, and/or the like within connected cabin system 100. Seat communication devices 144-1-144-N can be configured within connected cabin system 100 to facilitate per-passenger communications within the system. As noted above, the connected cabin system 100 of FIG. 1A may be considered an 'on-vehicle' system implemented for a mass transit vehicle, such as aircraft 102. As shown in FIG. 1B, the aircraft 102 can include a cabin in which a number of passengers can each be seated via each of a number of seats, shown in FIG. 1B as seats 104-1 thru 104-10, for a duration of travel involving the aircraft. A number of seat communication devices 144-1 thru 144-10 are also shown in FIG. 1B.

In various embodiments, seat communication devices provided for a mass transportation vehicle, such as seat communication devices 144-1, 144-2, 144-3, 144-4, 144-5, 144-6, 144-7, 144-8, 144-9, and 144-10 shown in FIG. 1B, can be provided within the cabin of aircraft 102 such that each passenger located in each corresponding seat can interact with a corresponding seat communication device for the duration of travel involving aircraft 102 for various services that may be provided to the passengers during the duration of travel.

In addition to facilitating passenger services, seat communication devices provided for aircraft 102 can be configured with unique identifying information that identifies a location of each seat communication device within the cabin of aircraft 102 in relation to the corresponding passenger utilizing each device for a corresponding seat with the cabin of aircraft 102. For example, seat communication device 144-7 can be identified by seat server 142 for any communications with seat server 142 to identify the corresponding seat 104-7/passenger within seat 104-7 such that the seat/passenger can be located within the cabin of aircraft 102 for any passenger services requested by the passenger of the seat, media requested/consumed by the passenger, etc.

Thus, in some embodiments seat communication devices may be housed within a seatback of seat. For example, seat communication device 144-2 can be housed with a seatback of seat 104-1 such that a passenger for seat 104-2 can interact with seat communication device 144-2. In other embodiments, such as for seats that may not be behind another seat, seat communication devices may be housed in a structural feature provided within a cabin of a mass transportation device, such as a bulkhead, a wall, or the like. For example, seat communication device 144-1 can be housed on a cabin wall 105-1 within the cabin of aircraft 102 such that a passenger of seat 104-1 can interact with seat communication device 144-1, seat communication device 144-4 can be housed on a cabin wall 105-2 within the cabin of aircraft 102 such that a passenger of seat 104-4 can interact with seat communication device 144-4, and seat communication device 144-7 can be housed on a cabin wall 105-3 within the cabin of aircraft 102 such that a passenger of seat 104-7 can interact with seat communication device 144-7. Other configurations of seat communication devices can be envisioned depending on the configuration of a cabin and/or seats of a given mass transportation vehicle.

Further as shown in FIG. 1B, the cabin of aircraft 102 can be divided or separated into a number of different cabin locations, which may represent different levels and/or priorities of seating and/or services that may be provided for passengers traveling aboard aircraft 102 for a duration of travel. For example, as shown in FIG. 1B, the cabin of aircraft 102 can be divided into a first cabin location 103-1 that encompasses a first or premium class or level of seating (e.g., class 1, including seats 104-1, 104-2, and 104-3), a second cabin location 103-2 that encompasses a second class or level of seating (e.g., class 2, such as a business class or the like, including seats 104-4, 104-5, and 104-6), and a third cabin location 103-3 that encompasses a third class or level of seating (e.g., class 3, such as an economy class, including seats 104-7, 104-8, 104-9, 104-10, etc.). In some instances, the different classes or levels of seating can represent a first or premium class, a business or executive class, a coach or economy class, and/or the like and may be characterized as different cabins or different cabin locations/zones/area within a given aircraft.

In some embodiments one or more cabin locations may further be divided into or include one or more sub-locations that may be associated with different sub-levels and/or sub-priorities of seating and/or services that may be provided for passengers traveling aboard aircraft 102 for a duration of travel. For example, in some instances, there may be multiple levels of first, business, and/or coach classes that may be associated with different seating levels and/or services.

Broadly during operation of various embodiments herein, LPNS 126 enables clients within connected cabin system 100, such as wireless crew devices 112-1-112-X, to connect to the wireless communication system 115 of aircraft 102 and subscribe or register to a list of 'actions' or push notifications (also referred to herein interchangeably as 'notification actions') that each wireless crew device 112-1-112-X is to receive (via the wireless communication system 115 provided by wireless APs 114-1 and 114-2) for a duration of travel involving aircraft 102. Such functionality can be facilitated via the travel application provisioned for each wireless crew device 112-1-112-X by the airline operating the fleet of aircraft including aircraft 102 such that the subscriptions/registrations initiated by each wireless crew device 112-1-112-X may be individually tailored based on the role/location(s) assigned to each corresponding travel crew member 111-1-111-X for each of one or more specific duration(s) of travel involving one or more different mass transportation vehicles (e.g., different flights involving different aircraft).

LPNS 126 may provide a RESTful API (not shown in FIG. 1A) through which external callers, such as seat communication devices 144-1-144-N via connected cabin API 124, can initiate requests or other actions towards LPNS, which can trigger sending notifications by LPNS 126 towards to all clients (e.g., wireless crew devices) that have subscribed to each of one or more notifications, along with a freeform payload that can be used for other functions and/or to carry other information (e.g., seat/passenger location initiating a request, type of request, request details, etc.) via a persistent WebSocket connection maintained between each of the clients and LPNS 126, which can be configured with a WebSocket interface (not shown in FIG. 1A). The persistent WebSocket connection can allows the clients (wireless crew devices) to wake-up and execute instructions in order to receive the notifications when the LPNS 126 sends a "push" notification message via the WebSocket with each client that has registered to receive the notifications. LPNS 126 can store a list of clients and notifications for which each client has registered via a connected clients database (not shown in FIG. 1A).

Thus, in at least one embodiment, a wireless crew device can subscribe to notifications that are to be received by the device for a duration of travel involving a mass transportation vehicle based on the travel crew member that operates the wireless crew device being specifically assigned to the specific vehicle for the specific duration of travel in order to provide services (e.g., passenger services) for passengers traveling aboard the vehicle for the specific duration of travel.

More specifically, notification(s) that are to be received by a given wireless crew device of a given travel crew member may be based on the travel crew member being assigned to provide services for a specific duration of travel involving a specific vehicle, as well as being based on a role of the travel crew member for the duration of travel involving the vehicle and on one or more locations of a cabin of the specific vehicle to which the travel crew member is assigned to perform passenger services for the duration of travel involving the vehicle.

For instance, in one illustrative example, consider that travel crew member 111-1 operating wireless crew device 112-2 is assigned to work on (e.g., provide passenger services) aircraft 102 for a duration of travel (e.g., a flight) that is to begin at an originating airport and end at a destination airport. Further, consider that the travel crew member 111-1 is assigned to provide passenger services for passengers that may be seated within the first class/level of seating provided at cabin location 103-1 of the aircraft 102 for the duration of travel.

Wireless crew device 112-1 can be periodically updated (e.g., daily, weekly, etc.) with travel assignment information identifying travel details for different durations of travel involving different aircraft to which travel crew member 111-1 is assigned (e.g., flight numbers, originating cities/airports/airport codes, flight times, etc.), a role (or roles) of the travel crew member for each duration of travel for each aircraft, location(s) within the cabin of each aircraft to which the travel crew member is assigned, and SSID information/connection credentials (e.g., username, password, certificates, etc.) to enable wireless crew device 112-1 to connect wireless communication systems for different aircraft. For example, a vehicle fleet operator, such as an airline, etc. can periodically push or otherwise communicate travel assignment information to each wireless crew device 112-1-112-X of each travel crew member 111-1-111-X that identifies the assignments of each travel crew member 111-1-111-X for a given period of time. Travel assignment information can be pushed/communicated to wireless crew devices 112-1-112-X using any over-the-air RF and/or web-based update mechanisms (e.g., via the public internet, an enterprise network, etc.) via one or more servers, etc. of the vehicle fleet operator using any techniques now known and/or hereinafter developed as would be understood by a person of ordinary skill in the art.

In various embodiments, travel crew member roles can include, but not be limited to "flight leader, "service leader," and "purser" in which each role may be assigned different responsibilities and/or locations within the cabin for which to provide various passenger services throughout a duration of travel involving a given aircraft. In some instances, flight leader may be considered a highest responsibility role, while purser may be considered a lowest responsibility role, with service leader being considered a medium responsibility role. In some embodiments, the responsibilities of each role may vary depending on the type of route being flown.

In some embodiments, different "leader" roles may be used to identify which travel crew members have the authority to edit information seen by passengers via seat communication devices (e.g., seat communication devices 144-1-144-10) (e.g., cackling or rescheduling meal service), while travel crew members having lower/non-leader roles may only have read-only access to such information.

In some embodiments, the location to which a travel crew member is assigned for a particular duration of travel for an aircraft can be tied to a particular role to which the travel crew member is assigned such that specific roles may be assigned to work locations, such as different cabins/classes (e.g., first, business, economy, etc.) and/or sets of seats within an aircraft (or particular cabin/class), which can impact the notifications that are to be received by the travel crew member.

In one example, the SSID information/connection credentials may be configured such that they can be utilized for multiple aircraft within a fleet of aircraft operated by the airline. Thus, SSID information for a wireless communication system for a given aircraft may not uniquely identify each aircraft within the fleet (e.g., 2-4 unique SSIDs may be reused across an entire fleet). Rather, vehicle travel information configured/provided for vehicle travel database 128 may identify the specific travel information/travel details involving each flight that aircraft 102 is to serve for a period of time (e.g., days, times within a day, week, or any other calendar/schedule-based information that may be applicable) in which the vehicle travel information can include any combination of flight numbers, originating cities/airports/airport codes, flight times, etc. that can be used to identify the specific flight(s) that are to be served by the aircraft 102.

In at least one embodiment, say, for an embodiment in which a wireless communication system provided for a mass transportation vehicle includes cellular coverage, wireless crew devices can be provisioned, via an electronic/embedded/universal/integrated Subscriber Identity Module (SIM) provided for the devices, with PLMN-ID information and cellular identifiers/credentials (e.g., an International Mobile Subscriber Identity (IMSI) or the like) to enable such devices to attach to a cellular network provided for one or mass transportation devices.

In some embodiments, travel information/travel details for aircraft 102 may include a list of one or more hospitality services that may and/or may not be offered for each flights involving the aircraft. For example, some flights may include a snack and beverage service but not a meal service, while other flights may include a combination of snack, beverage, and meal services. Other variations of different combinations of hospitality services that may/may not be provided for one or more flights can be envisioned and, as such, could also be identified in travel information/travel details involving one or more flights for an aircraft.

Returning to the embodiment of FIG. 1A, utilizing local push notification technology now known in the art or hereinafter developed, wireless crew device 112-1 can be triggered upon detecting the SSID for the wireless communication system 115 of aircraft 102 (as provided/broadcast by wireless APs 114-1 and 114-2) to "wake up" and execute instructions (via control logic provided for the device) to attempt to register for one or more notifications that may occur for passengers located at cabin location 103-1 for the flight involving aircraft 102. For example, travel crew member 111-1 can enter or be near the cabin of aircraft 102 or, more specifically, the wireless coverage area provided by wireless APs 114-1 and 114-2, such that wireless crew device 112-1 can detect the SSID broadcast by wireless APs 114-1 and 114-2 identifying the wireless communication system 115 of aircraft 102.

Detecting the SSID can trigger wireless crew device 112-1 to connect to the wireless communication system 115 for aircraft 102 and retrieve vehicle travel information identifying specific travel details for one or more durations of travel involving the aircraft 102 via vehicle travel database 128. Upon obtaining the vehicle travel information for aircraft 102, wireless crew device can compare the vehicle travel information for aircraft 102 to the travel assignment information stored via wireless crew device 112-1 that identifies travel details for different durations of travel involving different aircraft to which travel crew member 111-1 is assigned say, for example, for a given day, to determine whether the vehicle travel information for the aircraft 102 matches any of the travel assignment information stored via wireless crew device 112-1 for travel crew member 111-1.

Upon determining a match between the vehicle travel information for aircraft 102 and the travel assignment information stored via wireless crew device 112-1 (i.e., the travel crew member 111-1 is assigned to the specific flight that is to be provided by aircraft 102), wireless crew device 112-1 initiates subscription or registration with LPNS 126 for one or more notifications that are to be received by the wireless crew device 112-1/travel crew member 111-1 based on the role of travel crew member 111-1 and on one or more locations of the cabin of the aircraft 102 to which the travel crew member 111-1 is assigned to perform passenger services for the specific flight involving the aircraft 102.

A persistent WebSocket connection is maintained between the wireless crew device 112-1 and LPNS 126 that allows the wireless crew device 112-1 to wake-up and execute instructions in order to receive the notifications when the LPNS 126 sends a "push" message via the WebSocket.

It is to be understood that different travel crew members can each receive different travel assignment information for different assigned flights. Further, it is to be understood that different travel crew members, even if assigned the same flight, can be assigned different roles and/or the same or different locations with the cabin of an aircraft for passenger services that are to be provided by the travel crew members for a given flight. Thus, each corresponding wireless crew device 112-1-112-X can subscribe to any combination of the same or different notifications for a given flight based on corresponding assignments for each corresponding travel crew member 111-1-111-X for each of a corresponding flight or flights and travel information/details provided to each wireless crew device 112-1-112-X for each of the flight or flights.

Figure 2A:
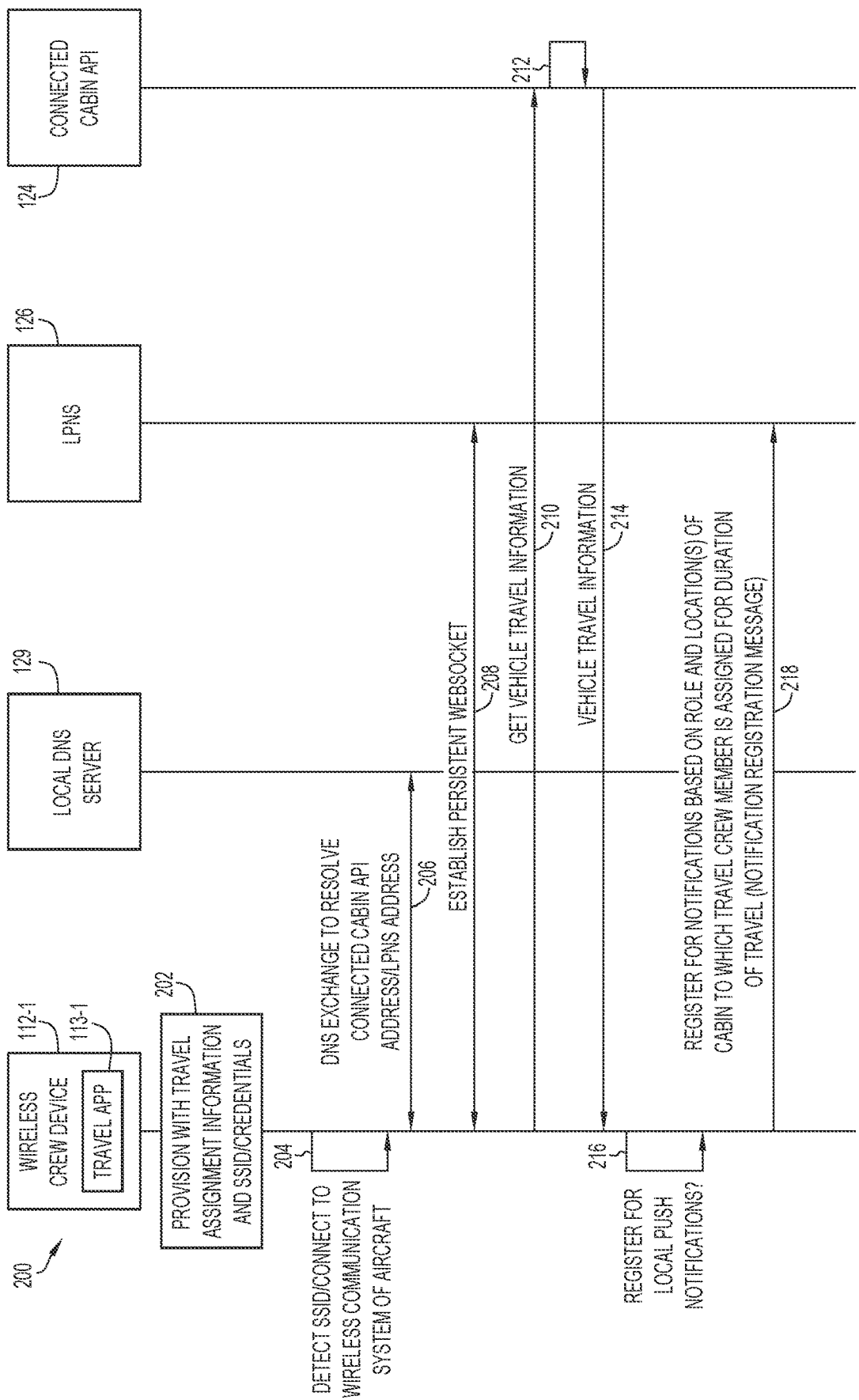
FIG. 2A is a message sequence diagram illustrating various operations that may be performed in order to facilitate registration for local push notifications by a wireless crew device of a travel crew member for a mass transportation vehicle, according to an example embodiment.
Figure 2B:
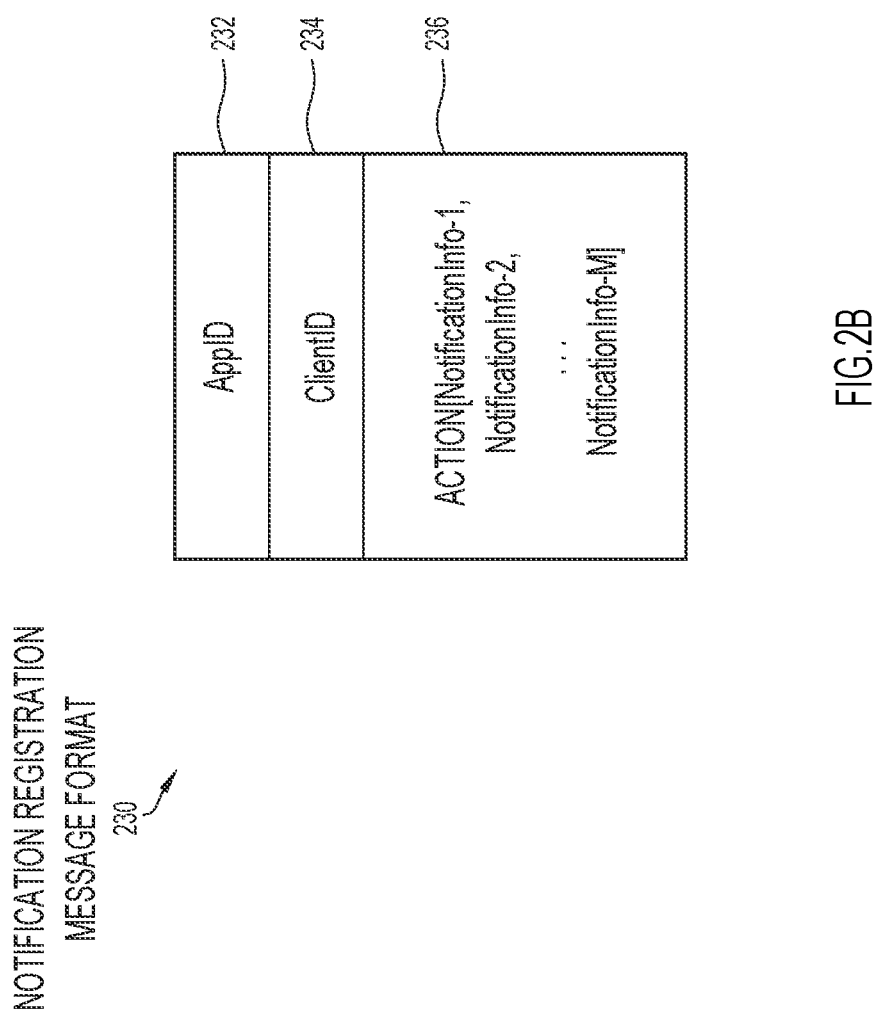
FIG. 2B is a schematic diagram illustrating an example notification registration message format that may be utilized to register for local push notifications by a wireless crew device of a travel crew member for a mass transportation vehicle, according to an example embodiment.

With reference to FIG. 2A, FIG. 2A is a message sequence diagram 200 illustrating example operations associated that may be performed in order to facilitate registration for local push notification(s) by wireless crew device 112-1 of travel crew member 111-1 for aircraft 102, according to an example, embodiment. FIG. 2B is a schematic diagram illustrating an example registration message format 230 that may be utilized to register for local push notifications by a wireless crew device of a travel crew member for a mass transportation vehicle, according to an example embodiment, and is discussed with reference to FIG. 2A.

FIG. 2A includes wireless crew device 112-1 (including a travel application (app) 113-1 that may include any application logic that can be utilized by wireless crew device 112-1 to perform any operations as discussed for embodiments herein) of travel crew member 111-1, a local domain name system (DNS) server 129, LPNS 126, and connected cabin API 124. In at least one embodiment, local DNS server can be configured via vehicle network server 120 and may facilitate resolving Internet Protocol (IP) address and/or Uniform Resource Locator (URL) information for one or more elements, nodes, functions, etc. that can be provided within connected cabin system 100.

As shown at 202, consider that wireless crew device 112-1 is provisioned with travel assignment information for one or more flights/aircraft to which travel crew member 111-1 is assigned (e.g., duration(s) of travel for (different) aircraft to which the travel crew member 111-1 is assigned), say, for example, for a particular airline operating a fleet of aircraft for a given day. The wireless crew device 112-1 is also provisioned with SSID information and connection credentials to enable wireless crew device 112-1 to detect/connect to wireless communication systems of aircraft of the fleet operated by the airline.

For the embodiment of FIG. 2A, consider that the travel assignment information provisioned for wireless crew device 112-1 includes travel details for a flight (duration of travel) involving aircraft 102 to which travel crew member 111-1 is assigned to provide passenger services, etc. In addition to the travel details for the flight involving aircraft 102, consider that the travel assignment information identifies that travel crew member 111-1 is assigned a role of "flight leader" and is assigned to provide passenger services for cabin location 103-1 (e.g., for class 1, such as a first or premium class, for example) for the flight involving aircraft 102.

In various embodiments, wireless crew device 112-1 can be provisioned with the travel assignment information for travel crew member 111-1 via over-the-air updates pushed to the device/travel app 113-1 (provided by the airline operating aircraft 102) each day at a given time for the specific travel crew member 111-1), can be retrieved by the travel crew member 111-1 via the travel app 113-1, combinations thereof, and/or the like.

Continuing to 204, consider that wireless crew device 112-1 detects the SSID broadcast by wireless APs 114-1 and 114-2 for aircraft 102 and connects to the wireless communication system 115 of the aircraft 102 using the SSID/credential information provisioned for the wireless crew device 112-1/travel app 113-1.

Detecting the SSID can be a trigger indicating that the wireless crew device 112-1 is to connect to the wireless communication system 115 of aircraft 102 and is to attempt to register for local push notifications for the aircraft 102 for a duration of travel involving the aircraft 102. For example, as shown at 206, following connection of the wireless crew device 112-1 to the wireless communication system 115 of aircraft 102, wireless crew device 112-1 can perform a DNS exchange with local DNS server 129 in order to resolve the connected cabin API 124 IP address and the LPNS 126 IP address.

Prior to obtaining vehicle travel information for aircraft 102, as shown at 208, a persistent WebSocket connection can be established between the wireless crew device 112-1 and LPNS 126 that allows the wireless crew device 112-1 to register for and receive notifications (notification actions) from LPNS 126. In at least one embodiment, the persistent WebSocket connection can be established based on a request message sent from the wireless crew device 112-1, which may be a JavaScript Object Notation (JSON) encoded request message that includes an identifier of the travel app 113-1 (e.g., com.provider.travelapp) and an identifier (ID) for wireless crew device 112-1 (e.g., a client ID for the wireless crew device 112-1), such as an IP address for the wireless crew device 112-1, a Media Access Control (MAC) address for the wireless crew device 112-1, and/or the like for wireless crew device 112-1 that can be registered with/stored by LPNS 126 and/or a database maintained/managed thereby for any supported actions provided by the LPNS 126, such as pushing notifications or notification actions to the registered wireless crew device.

Continuing to 210, the wireless crew device 112-1 initiates a query to connected cabin API 124 in order to obtain vehicle travel information for aircraft 102 in order to determine whether a corresponding flight for aircraft 102 is a flight to which travel crew member 111-1 is actually assigned (and is to register for notifications, etc.). In at least one embodiment, the query at 210 may be a Hypertext Transfer Protocol (HTTP) GET message sent to the connected cabin API 124 requesting flight information (e.g., vehicle travel information) for the corresponding flight for aircraft 102.

Upon obtaining the query from wireless crew device 112-1, connected cabin API 124 retrieves, as shown at 212, the vehicle travel information for aircraft 102 via vehicle travel database 128 (not shown in FIG. 2A) and sends the vehicle travel information for aircraft 102 to wireless crew device 112-1, as shown at 214.

At 216, wireless crew device 112-1 determines whether it is to register for local push notifications for the aircraft 102 or, more specifically, whether travel crew member 111-1 is assigned to the flight involving aircraft 102 based on comparing the vehicle travel information obtained at 214 to the travel assignment information stored via wireless crew device 112-1 that identifies travel details for different durations of travel involving different aircraft to which travel crew member 111-1 is assigned, to determine whether the vehicle travel information for the aircraft 102 matches any of the travel assignment information stored via wireless crew device 112-1 for travel crew member 111-1.

For example, the comparison performed at 216 may identify that the flight number, originating city information, and flight times for the corresponding flight for aircraft 102 matches the same travel assignment information stored for travel crew member 111-1 via wireless crew device 112-1.

In at least one embodiment, the comparison performed at 216 may further include performing a comparison between one or more service(s) offered for the corresponding flight (e.g., as identified vie travel information/details obtained for aircraft 102) in relation to travel assignment information stored via wireless crew device 112-1 identifying a role (or roles) and location(s) of the cabin of aircraft 102 to which the travel crew member 111-1 is assigned in order to identify one or more types of notifications to which to register/subscribe (e.g., order requests from the class 1 cabin, service requests from the class 1 cabin, order requests from the class 3 cabin, etc.).

Upon determining a match between the vehicle travel information obtained at 214 and travel assignment information for travel crew member 111-1 stored via wireless crew device 112-1, wireless crew device 112-1 can, as shown at 218, subscribe or register with LPNS 126 (with which the persistent WebSocket connection was been established at 208), for one or more notifications that are to be received by the wireless crew device 112-1 for the corresponding flight involving aircraft 102 based on the role that is assigned to the travel crew member 111-1 for the flight and the one or more locations of the cabin of the aircraft 102 to which the travel crew member 111-1 is assigned for the flight. Wireless crew device 112-1 may send a notification registration message to LPNS 126 in order to subscribe/register for the one or more notifications. In at least one embodiment, the notification registration message sent at 218 may be formatted as JSON encoded message including one or more fields that facilitate registration for notification(s) to be received by wireless crew device 112-1 for the duration of flight involving aircraft 102. In at least one embodiment, although not shown in FIG. 2A, LPNS 126 can send a confirmation to wireless crew device 112-1 regarding successful registration for the notifications.

However, if it is determined at 216 that there is not a match between any of the vehicle travel information obtained at 212 and any of the travel assignment information for travel crew member 111-1 stored via wireless crew device 112-1, wireless crew device 112-2 determines that the travel crew member 111-1 is not assigned to the corresponding flight involving aircraft 102 and, thus, would not register for any notifications to be received for the flight involving aircraft 102.

In at least one example (upon determining a match at 216), the registration performed at 218 can include the wireless crew device 112-1 registering, for example, to receive notifications for any combination of food requests, beverage requests, and/or any other passenger service requests originating/being sent from any of the seat communication devices associated with any of the seats located in at least cabin location 103-1 to which travel crew member 111-1 is assigned for the flight, such as being sent from any passengers/seat communication devices associated with any of seats 104-1 thru 104-3.

However, as the travel crew member 111-1 is not assigned to cabin location 103-2 and 103-3 for the flight, wireless crew device 112-1 may not register for certain types of notifications that may originate/be sent from seats located in cabin locations 103-2 and 103-3, such as food/drink orders, and/or other service requests for services that may be requested by passenger(s) sitting in the various cabin locations.

In some embodiments, wireless crew device 112-1 may register for other types of notifications that may originate from any cabin locations, such as notifications that may not be service request specific notifications, which may include, but not be limited to, emergency notifications, and/or any other universal or non-service-request-specific type notifications that may be initiated by passengers for a duration of travel involving the aircraft 102.

Thereafter, for the duration of travel involving the aircraft 102, travel crew member 111-1 can receive local push notifications sent from LPNS 126 to the wireless crew device 112-1 via the persistent WebSocket maintained between the wireless crew device 112-1 and LPNS 126 that allows the wireless crew device 112-1 to wake-up and execute instructions in order to receive the notifications when the LPNS 126 sends a "push" message via the WebSocket. Additional example details for example local push notification operations that may be performed for the connected cabin system 100 are discussed herein below.

Following a duration of travel (trip) for a travel crew member, once the travel crew member/wireless crew device exits the aircraft 102 and is no longer connected to wireless communication system 115, the wireless crew device for the travel crew member would not receive any local push notifications involving a connected cabin system.

FIG. 2B is a schematic diagram illustrating an example notification registration message format 230 that may be utilized to register for local push notifications by a wireless crew device of a travel crew member for a mass transportation vehicle, according to an example embodiment. For example, wireless crew device 112-1 may utilize the notification registration request message format 230 for registering for one or more local push notifications, as shown at 218 of FIG. 2A.

In at least one embodiment, the notification registration message format 230 can be a JSON encoded message format including a number of message fields, such as an application identifier (AppID) field 232, a client identifier (ClientID) field 234, and an Action field 236.

In at least one embodiment, the AppID field 232 can be set to identify the travel application through which the persistent WebSocket was established for a given wireless crew device (e.g., com.provider.travelapp) and the ClientID field 234 can be set identifier that the wireless crew device used for establishing the persistent WebSocket with LPNS 126 (e.g., IP address, MAC address, etc. for the wireless crew device).

The Action field 236 can be encoded with notification information (shown in FIG. 2B as NotificationInfo-1, NotificationInfo-2, thru NotificationInfo-M) for each of one or more notifications or notification actions to which the wireless crew device is subscribing/registering for notifications for the duration of travel involving a vehicle (e.g., aircraft 102).

The notification information encoded in the Action field 236 can be encoded in any format in order to identify notification(s) for which a wireless crew device may register/subscribe based on the role of a given travel crew member for the duration of travel involving the vehicle and the one or more locations of a cabin of the vehicle to which the travel crew member is assigned to perform passenger services for the duration of travel involving the vehicle. The format of the notification information to be included in the Action field of a notification request message can be encoded in logic provided for the travel application provided for wireless crew devices and encoded in logic provided for LPNS 126 in order to appropriately identify notification(s) subscribed to by any wireless crew devices for any duration (s) of travel involving a vehicle.

In some embodiments, notification information included in the Action field 236 for a given notification registration message may be formatted with a [Notification Type, Cabin Location(s)] format such that a 'Notification Type' indicator may be set to a particular name that identifies a type of notification, such as 'cabin order', 'do not disturb', etc., for which a device is registering, and a 'Cabin Location(s)' indicator may be set to one or more locations of the cabin of the23rovidint to which the travel crew member is assigned (e.g., identifying cabin location 103-1, etc.).

In some embodiments, notification information included in the Action field 236 for a given notification registration message may be formatted with a [NotificationLabel] format such that a given 'NotificationLabel' may be set to a particular name that identifies both a type of notification and a location associated with the notification type for which a device is registering. For example, a NotificationLabel set to "premium cabin order" may identify both a food/beverage or any other service order/request type notification and that the service order request type is specific to a particular location within the cabin of a vehicle, such as the premium or first class cabin location (e.g., class 1); while a NotificationLabel set to "economy cabin order" may identify both a service order/request type notification and that the service order request type is specific to a particular location within the cabin of the vehicle, such as the economy class cabin location (e.g., class 3).

These example formats for notification information and/ or fields included in a notification request message for various notification(s) to which a wireless crew device may register/subscribe are provided for illustrative purposes only and are not meant to limit the broad scope of embodiments herein. Virtually any other formats for subscribing/registering for notifications by a wireless crew device may be provided and, therefore, are clearly within the scope of the teachings of embodiments herein. In some embodiments, for example, a JSON encoded message can further include one or more payload fields including other information for a message.

By subscribing/registering to location specific notifications for a vehicle, embodiments herein provide not only that a wireless crew device may receive notifications for passenger requests originating from the locations of a cabin to which a travel crew member is assigned for a duration of travel involving a vehicle but may also provide that the wireless crew device may not receive notifications for passenger requests originating from locations of the cabin that the travel crew member is not assigned for the duration of travel involving the vehicle. For example, a travel crew member assigned to provide passenger services for a first class cabin of a vehicle may not receive passenger requests for passengers located outside the first class cabin of the vehicle (e.g., in the economy or coach cabin) or, vice-versa, a travel crew member assigned to provide passenger services to the economy or coach cabin locations may not receive notifications for passenger requests originating form the first class cabin location.

Further, consider various example scenarios in which travel crew member role, in addition one or more locations of the cabin of the aircraft 102 to which the travel crew member is assigned for a given flight, may impact the type(s) of notifications for which the wireless crew device of the crew member may register for the flight. For example, in one instance, a travel crew member that is assigned a flight leader role for a flight may have the authority to handle passenger upgrade requests, passenger seat change requests such that the wireless crew device of the travel crew member would register for notifications involving such types of passenger requests. In contrast, a travel crew member that is assigned a purser role for a flight (or some other non-leader role), may not have the authority to handle such upgrade/seat change/etc. requests and, thus, the wireless crew device of the travel crew member having such a 'non-leader' role would register not for notifications involving such types of passenger requests but, instead, may only register for basic hospitality services type requests (e.g., food, beverage, etc.). Thus, travel crew member role for a given flight may impact the notification(s) for which the wireless crew device of the member may register for the given flight.

Figure 3:
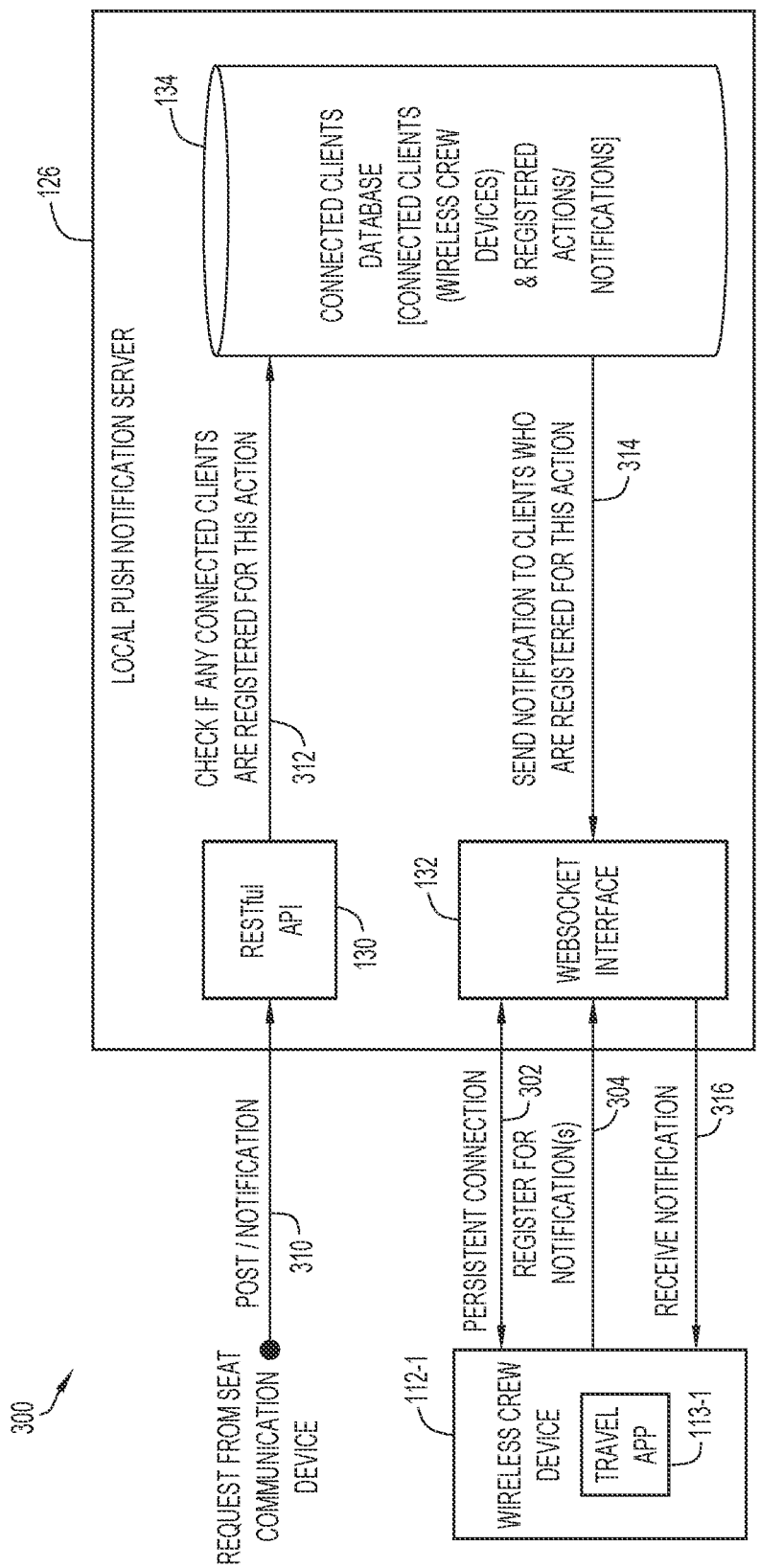
FIG. 3 is a block diagram illustrating example operations that may be performed to facilitate receiving a passenger request and providing a local push notification for a wireless crew device of a travel crew member for a mass transportation vehicle, according to an example embodiment.

Referring to FIG. 3, FIG. 3 is a block diagram 300 illustrating example operations that may be performed to facilitate receiving a passenger request via a seat communication device of aircraft 102 and providing a local push notification for wireless crew device 112-1 (configured with travel app 113-1) of travel crew member 111-1, according to an example embodiment. As noted above, LPNS 126 can expose both a RESTful API and WebSocket interface in which the WebSocket interface can be used for clients (wireless crew devices) to connect to the LPNS and register or subscribe to a list of "actions" for which they clients desire to receive updates or, more specifically for embodiments herein, notifications regarding various type(s) of passenger requests for cabin location(s) to which each travel crew member is assigned.

As shown in FIG. 3, LPNS 126 may include a RESTful API 130, a WebSocket interface 132, and a connected clients database 134. When a wireless crew device, such as wireless crew device 112-1 registers for one or more actions or notifications that are to be received from LPNS 126, information regarding the registration(s) for the wireless crew device 112-1 can be stored via connected clients database. In at least one embodiment, notification subscription/registration information stored for a wireless crew device, such as wireless crew device 112-1, may include a table identifying wireless crew device 112-1, such as an IP address for the wireless crew device, a Media Access Control (MAC) address for the wireless crew device, port information associated with the persistent WebSocket connection, etc. and one or more notifications to which the wireless crew device is registered can be stored via connected clients database 134. In at least one embodiment, location specific cabin information for aircraft 102 and role information identifying corresponding roles of each travel crew member pertaining to each of the registered notifications may also be stored via connected clients database 134 along with corresponding notifications for which each travel crew member/device is subscribed/registered to receive. As noted above, in at least one embodiment, the location to which a travel crew member is assigned for a particular duration of travel for an aircraft can be tied to a particular role to which the travel crew member is assigned such that specific roles may be assigned to work locations, such as different cabins/classes (e.g., first, business, economy, etc.) and/or sets of seats within an aircraft (or particular cabin/class) and could be used to determine which notifications are appropriate for registering for the wireless crew device.

Continuing from the example discussed above for FIG. 2A, consider for example, that wireless crew device 112-1 is registered with LPNS 126 to receive various passenger service notifications for providing passenger services for cabin location 103-1 (e.g., for both of class 1) for the flight involving aircraft 102. In this example, consider at 302 that wireless crew device 112-1 has established a persistent WebSocket connection with WebSocket interface 132 of LPNS 126 (e.g., as discussed above at 208 of FIG. 2A) and, at 304, has registered to receive one or more passenger service notifications from LPNS 126 (e.g., as discussed above at 218 of FIG. 2A).

In this example, consider that a passenger in seat 104-3 orders a beverage via seat communication device 144-3, which triggers a request to be sent to seat server 142 and connected cabin API 124 such that an HTTP POST notification is sent to LPNS 126 including details of the request (e.g., drink type, seat/passenger information, a notification action identifier such as "premium cabin order", an order identifier (ID), etc.), as shown at 310. The request is received via RESTful API 130 of LPNS 126 and triggers a look-up, as shown at 312, via connected client database 134 to check or identify if there are any travel crew members/connected wireless crew devices that are to receive a notification informing them of the passenger request (e.g., are registered for this action/notification), along with details of the request. For example, upon identifying via the look-up on connected clients database 134 that travel crew member 111-1/wireless crew device 112-1 is to receive the notification, LPNS 126 can initiate a notification to the wireless crew device 112-1, as shown at 314, such that the notification can be sent to wireless crew device 112-1, as shown at 316 (via the persistent WebSocket connection 302) maintained between wireless crew device 112-1 and LPNS 126/WebSocket interfaces 132.

It is to be understood that notifications can be sent to multiple wireless crew devices/travel crew members, based other registrations between such wireless crew devices and LPNS 126.

Figure 4:
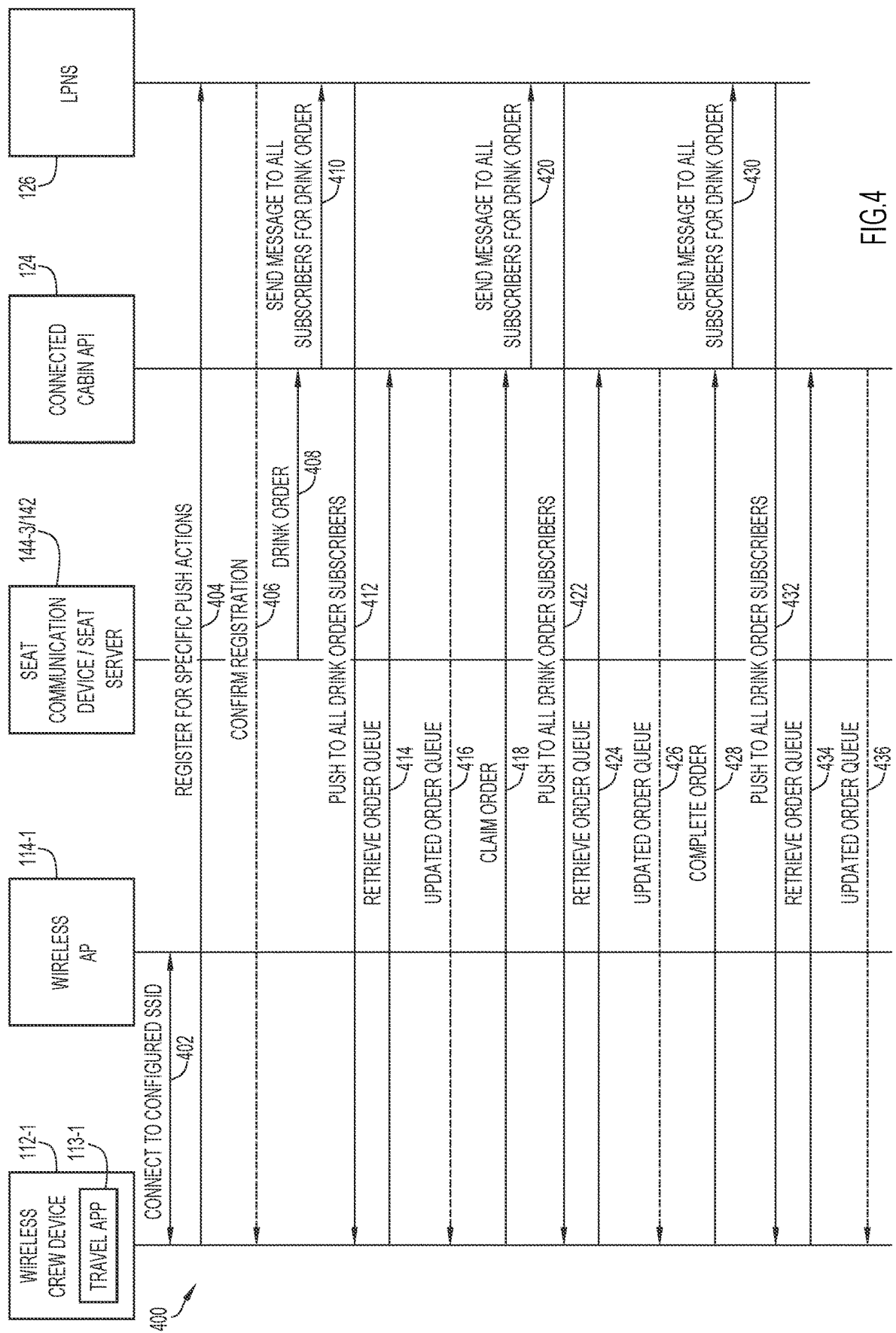
FIG. 4 is a message sequence diagram illustrating various operations that may be performed in order to facilitate local push notifications wireless crew device of a travel crew member for a mass transportation vehicle, according to an example embodiment.

With reference to FIG. 4, FIG. 4 is a message sequence diagram illustrating example operations 400 that may be associated with a passenger order and order fulfilment that may be facilitated via the connected cabin system 100, according to an example embodiment. FIG. 4 includes wireless crew device 112-1 configured with travel app 113-1, wireless AP 114-1, a seat communication device, which for the present example, can be seat communication device 144-3, and seat server 142. Also shown in FIG. 4 is connected cabin API 124, and LPNS 126.

Continuing from the example discussed above for FIG. 2A, consider for example, that wireless crew device 112-1, via travel app 113-1, is registered with LPNS 126 to receive various passenger service notifications for provide passenger services for cabin location 103-1 (e.g., for class 1) for the flight involving aircraft 102. In this example, consider at 402 that wireless crew device connects to wireless AP 114-1 and establishes a persistent connection with LPNS 126. As shown at 404, wireless crew device 112-1 can register for specific notifications or push actions that are to be provided via LPNS 126. In some embodiments, as shown at 406, LPNS 126 can send a confirmation to wireless crew device 112-1 regarding successful registration for the notifications.

As shown at 408, consider that a passenger in seat 104-3 initiates a drink order via seat communication device 144-3/seat server 142 that is sent to and stored via connected cabin API 124, which triggers a notification message to be sent towards all wireless crew devices via LPNS 126, as shown at 410, for such wireless crew devices that have subscribed/registered to receive such notifications for cabin location 103-1 and are of a corresponding role that may fulfill the drink order. Upon identifying such wireless crew devices, including wireless crew device 112-1 of travel crew member 111-1, LPNS 126 pushes an "update available" notification (e.g., "there is an update," such as the drink order, a "premium cabin order", or the like) to the wireless crew device 112-1, as shown at 412. In at least one embodiment, messages used for communications between a wireless crew device and/or connected cabin API 124 and LPNS 126 can be configured according to JSON conventions to communicate various information, notifications, etc. For example, some embodiments, a notification message encoded in a JSON notification message format may include an action field identifying the notification, such as "premium cabin order" and may include a payload field that includes an order ID for the passenger order, such that the wireless client device 112-1/travel app 113-1 can request details for the order (e.g., passenger information, seat information, etc.) using the order ID. In some embodiments, the notification encoded in a JSON message format may include a payload field that identifies passenger information, passenger seat information, combinations thereof, or the like that are associated with a given notification (or notifications) identified in an action field of a JSON encoded notification message sent to a wireless crew device.

Receiving the update from the LPNS 126 (at 412) triggers the application logic of wireless crew device (e.g., travel app 113-1) to wake up, refresh an order queue via connected cabin API 124 (as shown at 414 and 416), and determine what information is new (e.g., details for the drink order requested by the passenger at seat 104-3) and whether to display it via wireless crew device 112-1 (to the travel crew member). For example, some notifications may be handled silently by the wireless crew device 112-1, such as "do not disturb" requests or updates to such "do not disturb" requests, in which such passenger requests may update information associated with the passenger managed/maintained by the travel app 113-1 but may not issue a display notification to be provided on a display of wireless crew device.

In this example, a new order triggered the notification, so the travel crew member is provided the ability to "claim" the order (e.g., via a user interface (UI) radio button, etc.), as shown at 418. For example, using an order ID that may be included in the push notification message received by the wireless client device 112-1/travel app 113-1 at 412, the wireless client device 112-1/travel app 113-1 can claim the order initiated by the passenger located at seat 104-3.

When the order is claimed, the state of the order is updated on the connected cabin API 124 and the seat communication device 144-3 to show "in progress" for the passenger and another "update available" notification is pushed out via connected cabin API 124 and LPNS 126, as shown via operations 420, 422, 422, 424, and 426, marking the order as no longer available to claim (on other wireless crew devices for other travel crew members).

Once the order is fulfilled, the travel crew member can indicate via the application logic of wireless crew device 112-1 that the order is complete, as shown at 428, triggering another "update available" notification that can be pushed out via connected cabin API 124 and LPNS 126, as shown via operations 430, 432, 434, and 436 to the wireless crew devices and the seat communication device 144-2 indicating that the order has been completed.

Figure 5:
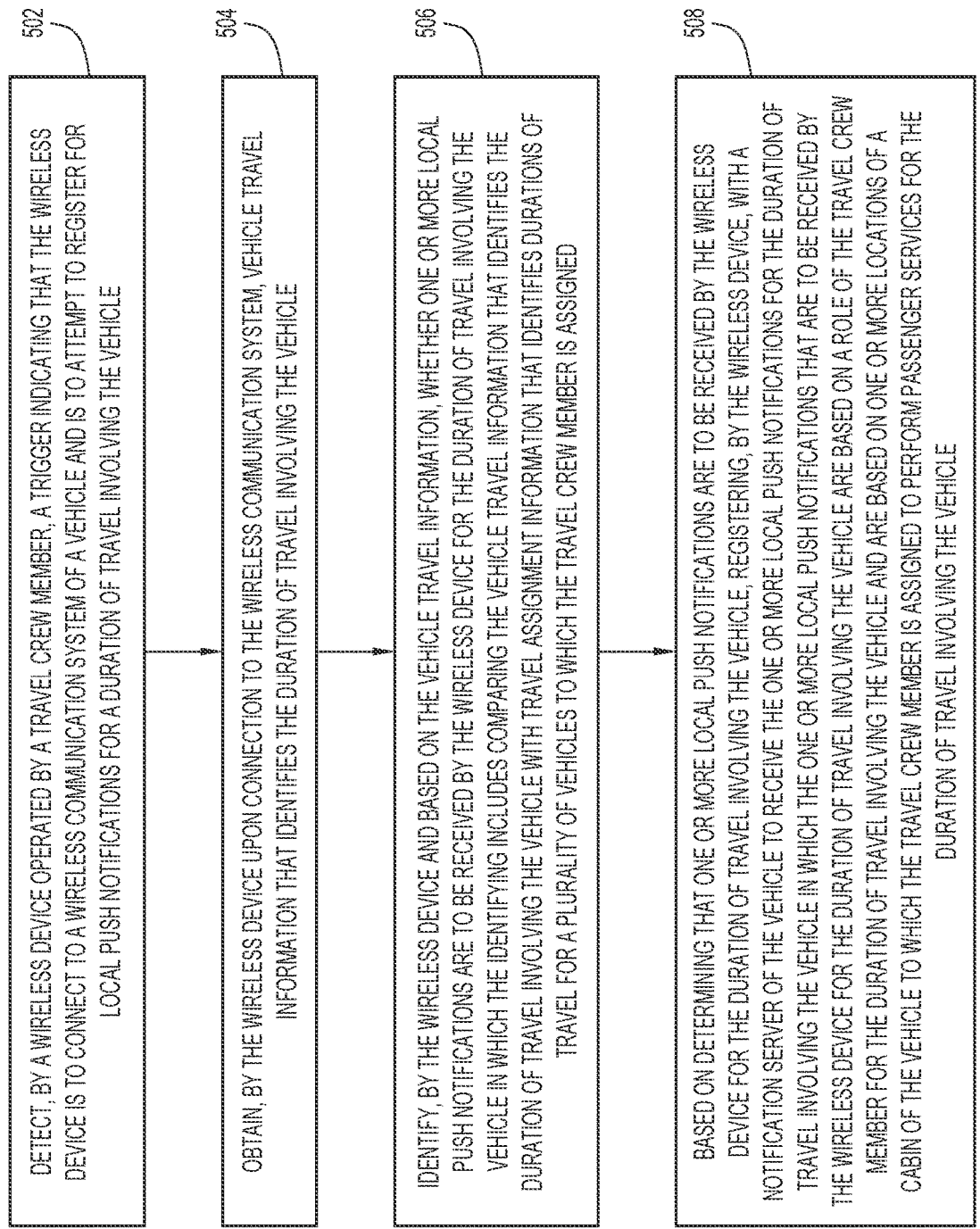
FIG. 5 is a flowchart depicting a method according to an example embodiment.

Referring to FIG. 5, FIG. 5 is a flowchart depicting a method 500 according to an example embodiment. In at least one embodiment, method 500 may be associated with techniques that may be utilized to facilitate registering for one or more push notifications that are to be received by a wireless crew device for a duration of travel involving a mass transportation device, according to an example embodiment. In various embodiments, method 500 may be performed by a computing device or combination of computing devices as discussed for embodiments herein, such as any of wireless crew devices 112-1-112-X.

As shown at 502, method 500 may include detecting, by a wireless device operated by a travel crew member, a trigger indicating that the wireless device is to connect to a wireless communication system of a vehicle and is to attempt to register for local push notifications for a duration of travel involving the vehicle.

At 504, the method may include obtaining, by the wireless device upon connection to the wireless communication system, vehicle travel information that identifies the duration of travel involving the vehicle. At 506, the method may include identifying, by the wireless device and based on the vehicle travel information, whether one or more local push notifications are to be received by the wireless device for the duration of travel involving the vehicle in which the identifying includes comparing the vehicle travel information that identifies the duration of travel involving the vehicle with travel assignment information that identifies durations of travel for a plurality of vehicles to which the travel crew member is assigned.

At 508, based on determining that one or more local push notifications are to be received by the wireless device for the duration of travel involving the vehicle, registering, by the wireless device, with a notification server of the vehicle to receive the one or more local push notifications for the duration of travel involving the vehicle in which the one or more local push notifications that are to be received by the wireless device for the duration of travel involving the vehicle are based on a role of the travel crew member for the duration of travel involving the vehicle and are based on one or more locations of a cabin of the vehicle to which the travel crew member is assigned to perform passenger services for the duration of travel involving the vehicle.

Figure 6:
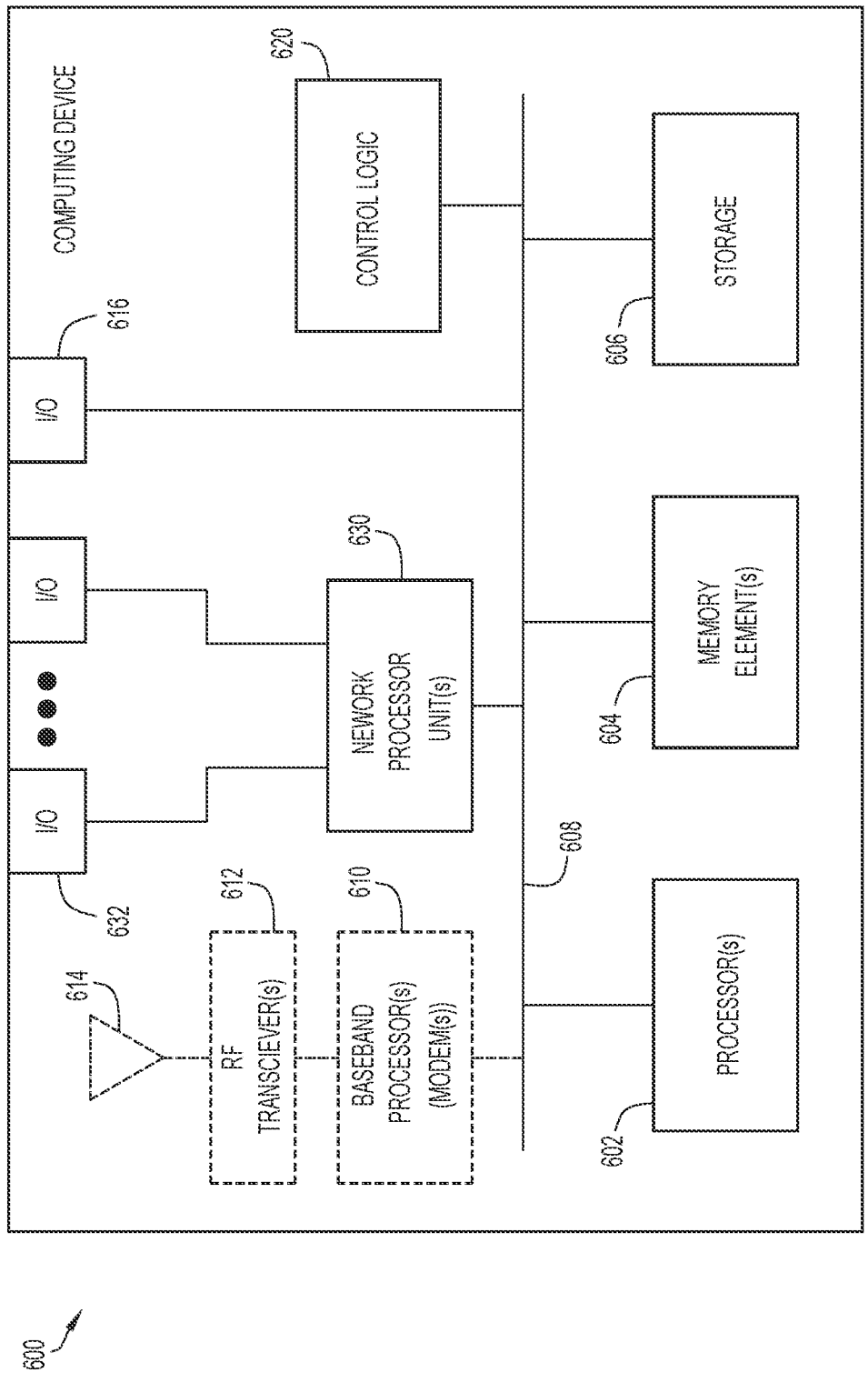
FIG. 6 is a hardware block diagram of a computing device that may perform functions associated with any combination of operations discussed in connection with techniques described for embodiments herein.

Referring to FIG. 6, FIG. 6 illustrates a hardware block diagram of a computing device 600 that may perform functions associated with operations discussed herein in connection with the techniques depicted in FIGS. 1A, 1B, 2A, 2B 3, 4, and 5. In various embodiments, a computing device or apparatus, such as computing device 600 or any combination of computing devices 600, may be configured as any entity/entities as discussed for the techniques depicted in connection with operations illustrated/discussed for various embodiments herein, such as any of wireless crew devices 112-1-112-X, vehicle network server 120, seat server 142, seat communication devices 144-1-144-N, wireless AP 114-1, and wireless AP 114-2 discussed herein, and/or any other elements/functions/nodes discussed herein.

In at least one embodiment, the computing device 600 may be any apparatus that may include one or more processor(s) 602, one or more memory element(s) 604, storage 606, a bus 608, one or more network processor unit(s) 630 interconnected with one or more network input/output (I/O) interface(s) 632, one or more I/O interface(s) 616, and control logic 620. In various embodiments, instructions associated with logic for computing device 600 can overlap in any manner and are not limited to the specific allocation of instructions and/or operations described herein.

For embodiments in which computing device 600 may be implemented as any device capable of wireless communications (e.g., wireless crew device 112-1-112-X, wireless AP 114-1, and wireless AP 114-2), computing device 600 may further include at least one baseband processor or modem 610, one or more radio RF transceiver(s) 612 (e.g., any combination of RF receiver(s) and RF transmitter(s)), one or more antenna(s) or antenna array(s) 614.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa) or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 630 may enable communication between computing device 600 and other systems, entities, etc., via network I/O interface(s) 632 (wired and/or wireless) to facilitate operations discussed for various embodiments described herein. In various embodiments, network processor unit(s) 630 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 632 can be configured as one or more Ethernet port(s), Fibre Channel ports, any other I/O port(s), and/or antenna(s)/antenna array(s) now known or hereafter developed. Thus, the network processor unit(s) 630 and/or network I/O interface(s) 632 may include suitable interfaces for receiving, transmitting, and/or otherwise communicating data and/or information (wired and/or wirelessly) in a network environment.

I/O interface(s) 616 allow for input and output of data and/or information with other entities that may be connected to computing device 600. For example, I/O interface(s) 616 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 600 is implemented as a wireless device or any apparatus capable of wireless communications, the RF transceiver(s) 612 may perform RF transmission and RF reception of wireless signals via antenna(s)/antenna array(s) 614, and the baseband processor or modem 610 performs baseband modulation and demodulation, etc. associated with such signals to enable wireless communications for computing device 600.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include detecting, by a wireless device operated by a travel crew member, a trigger indicating that the wireless device is to connect to a wireless communication system of a vehicle and is to attempt to register for local push notifications for a duration of travel involving the vehicle; obtaining, by the wireless device upon connection to the wireless communication system of the vehicle, vehicle travel information that identifies the duration of travel involving the vehicle; identifying, by the wireless device and based on the vehicle travel information, whether one or more local push notifications are to be received by the wireless device for the duration of travel involving the vehicle, wherein the identifying includes comparing the vehicle travel information that identifies the duration of travel involving the vehicle with travel assignment information that identifies durations of travel for a plurality of vehicles to which the travel crew member is assigned; and based on determining that one or more local push notifications are to be received by the wireless device for the duration of travel involving the vehicle, registering, by the wireless device, with a notification server of the vehicle to receive the one or more local push notifications for the duration of travel involving the vehicle, wherein the one or more local push notifications that are to be received by the wireless device for the duration of travel involving the vehicle are based on a role of the travel crew member for the duration of travel involving the vehicle and are based on one or more locations of a cabin of the vehicle to which the travel crew member is assigned to perform passenger services for the duration of travel involving the vehicle.

In one instance, the cabin of the vehicle includes a plurality of locations at which passengers are located for the duration of travel involving the vehicle and the travel crew member is one of a plurality of travel crew members, each using an associated wireless device for the duration of travel involving the vehicle, that are to provide the passenger services for each of the plurality of locations of the cabin for the duration of travel involving the vehicle. In one instance, each location of the plurality of locations is associated with at least one of a level or a priority of seating for passengers of the vehicle for the duration of travel involving the vehicle. In one instance, each location of the plurality of locations includes a plurality of sub-locations that are associated with at least one sub-level or one sub-priority of seating for the passengers of the vehicle for the duration of travel involving the vehicle. In one instance, the one or more local push notifications that are to be received by the wireless device for the duration of travel involving the vehicle are based further on one or more sub-locations of the one or more locations of the cabin of the vehicle to which the travel crew member is assigned to perform the passenger services for the duration of travel involving the vehicle.

In one instance, the wireless communication system of the vehicle is a wireless local area network of the vehicle and the trigger detected by the wireless device is a Service Set Identifier (SSID) of the wireless local area network of the vehicle. In one instance, the wireless communication system of the vehicle is a private cellular access network of the vehicle and the trigger detected by the wireless device is a public land mobile network (PLMN) identifier of the private cellular access network. In one instance, the wireless communication system of the vehicle is isolated from and not connected to a public internet network or a wide area network for the duration of travel involving the vehicle. In at least one instance, the method may further include receiving at least one local push notification by the wireless device via the wireless communication system during the duration of travel involving the vehicle. In one instance, the wireless device does not receive any local push notifications when the wireless device is not connected to the wireless communication system of the vehicle.

In one instance, prior to obtaining the vehicle travel information that identifies the duration of travel involving the vehicle, the method further includes establishing, by the wireless device, a persistent websocket connection with the notification server. In one instance, vehicle travel information that identifies the duration of travel involving the vehicle includes one or more of: a flight number or trip number that identifies the duration of travel involving the vehicle; at least one of calendar information or timing information that identifies the duration of travel involving the vehicle; an originating location and a destination location that identifies the duration of travel involving the vehicle; or one or more passenger services that are to be provided during the duration of travel involving the vehicle.

In one instance, the wireless device does not identify that it is to receive the one or more local push notifications based on determining that the vehicle travel information that identifies the duration of travel involving the vehicle does not match any of the travel assignment information that identifies the durations of travel for the plurality of vehicles to which the travel crew member is assigned.

In one instance, the method may further include obtaining, by the wireless device, the travel assignment information that identifies the durations of travel for the plurality of vehicles to which the travel crew member is assigned prior to the wireless device detecting the trigger. In one instance, the vehicle is capable of traveling via at least one of air, water, or land.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    detecting, by a wireless device operated by a travel crew member, a trigger indicating that the wireless device is to connect to a wireless communication system of a vehicle and is to attempt to register for local push notifications for a duration of travel involving the vehicle;
    obtaining, by the wireless device upon connection to the wireless communication system of the vehicle, vehicle travel information that identifies the duration of travel involving the vehicle;
    identifying, by the wireless device and based on the vehicle travel information, whether one or more local push notifications are to be received by the wireless device for the duration of travel involving the vehicle, wherein the identifying includes comparing the vehicle travel information that identifies the duration of travel involving the vehicle with travel assignment information that identifies durations of travel for a plurality of vehicles to which the travel crew member is assigned; and
    based on determining that one or more local push notifications are to be received by the wireless device for the duration of travel involving the vehicle, registering, by the wireless device, with a notification server of the vehicle to receive the one or more local push notifications for the duration of travel involving the vehicle, wherein the one or more local push notifications that are to be received by the wireless device for the duration of travel involving the vehicle are based on a role of the travel crew member for the duration of travel involving the vehicle and are based on one or more locations of a cabin of the vehicle to which the travel crew member is assigned to perform passenger services for the duration of travel involving the vehicle.

2. The method of claim 1, wherein the cabin of the vehicle includes a plurality of locations at which passengers are located for the duration of travel involving the vehicle and the travel crew member is one of a plurality of travel crew members, each using an associated wireless device for the duration of travel involving the vehicle, that are to provide the passenger services for each of the plurality of locations of the cabin for the duration of travel involving the vehicle.

3. The method of claim 2, wherein each location of the plurality of locations is associated with at least one of a level or a priority of seating for passengers of the vehicle for the duration of travel involving the vehicle.

4. The method of claim 3, wherein each location of the plurality of locations includes a plurality of sub-locations that are associated with at least one sub-level or one sub-priority of seating for the passengers of the vehicle for the duration of travel involving the vehicle.

5. The method of claim 4, wherein the one or more local push notifications that are to be received by the wireless device for the duration of travel involving the vehicle are based further on one or more sub-locations of the one or more locations of the cabin of the vehicle to which the travel crew member is assigned to perform the passenger services for the duration of travel involving the vehicle.

6. The method of claim 1, wherein the wireless communication system of the vehicle is a wireless local area network of the vehicle and the trigger detected by the wireless device is a Service Set Identifier (SSID) of the wireless local area network of the vehicle.

7. The method of claim 1, wherein the wireless communication system of the vehicle is a private cellular access network of the vehicle and the trigger detected by the wireless device is a public land mobile network (PLMN) identifier of the private cellular access network.

8. The method of claim 1, wherein the wireless communication system of the vehicle is isolated from and not connected to a public internet network or a wide area network for the duration of travel involving the vehicle.

9. The method of claim 8, further comprising:
    receiving at least one local push notification by the wireless device via the wireless communication system during the duration of travel involving the vehicle.

10. The method of claim 8, wherein the wireless device does not receive any local push notifications when the wireless device is not connected to the wireless communication system of the vehicle.

11. The method of claim 1, wherein, prior to obtaining the vehicle travel information that identifies the duration of travel involving the vehicle, establishing, by the wireless device, a persistent websocket connection with the notification server.

12. The method of claim 1, wherein vehicle travel information that identifies the duration of travel involving the vehicle includes one or more of:
    a flight number or trip number that identifies the duration of travel involving the vehicle;
    at least one of calendar information or timing information that identifies the duration of travel involving the vehicle; or
    an originating location and a destination location that identifies the duration of travel involving the vehicle.

13. The method of claim 12, wherein the wireless device does not identify that it is to receive the one or more local push notifications based on determining that the vehicle travel information that identifies the duration of travel involving the vehicle does not match any of the travel assignment information that identifies the durations of travel for the plurality of vehicles to which the travel crew member is assigned.

14. The method of claim 1, further comprising:
    obtaining, by the wireless device, the travel assignment information that identifies the durations of travel for the plurality of vehicles to which the travel crew member is assigned prior to the wireless device detecting the trigger.

15. The method of claim 1, wherein the vehicle is capable of traveling via at least one of air, water, or land.

16. One or more non-transitory computer readable storage media encoded with instructions that, when executed by a processor, cause the processor to perform operations, comprising:

detecting, by a wireless device operated by a travel crew member, a trigger indicating that the wireless device is to connect to a wireless communication system of a vehicle and is to attempt to register for local push notifications for a duration of travel involving the vehicle;

obtaining, by the wireless device upon connection to the wireless communication system of the vehicle, vehicle travel information that identifies the duration of travel involving the vehicle;

identifying, by the wireless device and based on the vehicle travel information, whether one or more local push notifications are to be received by the wireless device for the duration of travel involving the vehicle, wherein the identifying includes comparing the vehicle travel information that identifies the duration of travel involving the vehicle with travel assignment information that identifies durations of travel for a plurality of vehicles to which the travel crew member is assigned; and based on determining that one or more local push notifications are to be received by the wireless device for the duration of travel involving the vehicle, registering, by the wireless device, with a notification server of the vehicle to receive the one or more local push notifications for the duration of travel involving the vehicle, wherein the one or more local push notifications that are to be received by the wireless device for the duration of travel involving the vehicle are based on a role of the travel crew member for the duration of travel involving the vehicle and are based on one or more locations of a cabin of the vehicle to which the travel crew member is assigned to perform passenger services for the duration of travel involving the vehicle.

17. The media of claim 16, wherein the instructions, when executed by a processor, cause the processor to perform further operations, comprising:

receiving at least one local push notification by the wireless device via the wireless communication system during the duration of travel involving the vehicle.

18. A wireless device comprising:

at least one memory element for storing data; and at least one processor for executing instructions associated with the data, wherein executing the instructions causes the wireless device to perform operations, comprising:

detecting, by the wireless device that is operated by a travel crew member, a trigger indicating that the wireless device is to connect to a wireless communication system of a vehicle and is to attempt to register for local push notifications for a duration of travel involving the vehicle;

obtaining, upon connection to the wireless communication system of the vehicle, vehicle travel information that identifies the duration of travel involving the vehicle;

identifying, based on the vehicle travel information, whether one or more local push notifications are to be received by the wireless device for the duration of travel involving the vehicle, wherein the identifying includes comparing the vehicle travel information that identifies the duration of travel involving the vehicle with travel assignment information that identifies durations of travel for a plurality of vehicles to which the travel crew member is assigned; and based on determining that one or more local push notifications are to be received by the wireless device for the duration of travel involving the vehicle, registering with a notification server of the vehicle to receive the one or more local push notifications for the duration of travel involving the vehicle, wherein the one or more local push notifications that are to be received by the wireless device for the duration of travel involving the vehicle are based on a role of the travel crew member for the duration of travel involving the vehicle and are based on one or more locations of a cabin of the vehicle to which the travel crew member is assigned to perform passenger services for the duration of travel involving the vehicle.

19. The wireless device of claim 18, wherein executing the instructions causes the wireless device to perform further operations, comprising:

obtaining the travel assignment information that identifies the durations of travel for the plurality of vehicles to which the travel crew member is assigned prior to detecting the trigger.

20. The wireless device of claim 18, wherein executing the instructions causes the wireless device to perform further operations, comprising:

receiving at least one local push notification by the wireless device via the wireless communication system during the duration of travel involving the vehicle.

* * * * *